United States Patent
Henderkott et al.

(10) Patent No.: US 10,810,730 B2
(45) Date of Patent: Oct. 20, 2020

(54) NONDESTRUCTIVE TESTING OF A COMPONENT

(71) Applicant: Rolls-Royce Corporation, Indianapolis, IN (US)

(72) Inventors: Joseph Peter Henderkott, Westfield, IN (US); Pramod Khandelwal, Indianapolis, IN (US); Danny Ray Carr, Plainfield, IN (US); Timothy Paul Fuesting, Thorntown, IN (US); Jeffrey F. Rhodes, Zionsville, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 1575 days.

(21) Appl. No.: 14/133,230

(22) Filed: Dec. 18, 2013

(65) Prior Publication Data

US 2014/0267694 A1    Sep. 18, 2014

Related U.S. Application Data

(60) Provisional application No. 61/777,989, filed on Mar. 12, 2013.

(51) Int. Cl.
*G06T 7/00* (2017.01)
*H04N 5/33* (2006.01)
*G01N 25/72* (2006.01)

(52) U.S. Cl.
CPC .......... *G06T 7/0008* (2013.01); *G01N 25/72* (2013.01); *H04N 5/33* (2013.01)

(58) Field of Classification Search
CPC ......... G01N 25/72; G06T 7/0008; H04N 5/33
(Continued)

(56) References Cited

U.S. PATENT DOCUMENTS

| | | |
|---|---|---|
| 3,566,669 A | 3/1971 | Lawrence et al. |
| 4,644,162 A | 2/1987 | Bantel et al. |

(Continued)

FOREIGN PATENT DOCUMENTS

| | | |
|---|---|---|
| DE | 3217906 A1 | 11/1983 |
| DE | 3323044 C1 | 10/1984 |

(Continued)

OTHER PUBLICATIONS

Muller (Real-time image processing and fusion for a new high-speed dual-band infrared camera), Infrared Imaging Systems: Design, Analysis, Modeling, and Testing XVIII, Proc. of SPIE vol. 6543, 654310, (2007).*

(Continued)

*Primary Examiner* — James T Boylan
(74) *Attorney, Agent, or Firm* — Shumaker & Sieffert, P.A.

(57) ABSTRACT

In some examples, a method for nondestructive testing of a component may include flashing the component using a flash lamp configured for flash thermography, collecting first image data regarding the component using an infrared camera, flowing a fluid through the component, and collecting second image data regarding the component using the infrared camera. A system for nondestructive testing of a component may include a single inspection station and a flash lamp configured for flash thermography, means for supplying a fluid to the component, and an infrared camera disposed at the inspection station.

19 Claims, 1 Drawing Sheet

(58) Field of Classification Search
USPC .......................................................... 348/132
See application file for complete search history.

(56) References Cited

U.S. PATENT DOCUMENTS

| | | | |
|---|---|---|---|
| 5,111,046 A | 5/1992 | Bantel | |
| 5,444,241 A | 8/1995 | Del Grande et al. | |
| 6,422,743 B1 | 7/2002 | Nirmalan et al. | |
| 6,570,175 B2 | 5/2003 | Bales et al. | |
| 6,714,281 B1* | 3/2004 | Amano | G03F 7/70641 |
| | | | 250/548 |
| 6,732,582 B2 | 5/2004 | Bunker et al. | |
| 7,075,083 B2 | 7/2006 | Beyer | |
| 7,388,204 B2 | 6/2008 | Key et al. | |
| 7,651,261 B2 | 1/2010 | Bunker et al. | |
| 7,671,338 B2 | 3/2010 | Key | |
| 7,822,263 B1* | 10/2010 | Prokoski | F42B 35/00 |
| | | | 382/152 |
| 2003/0179920 A1* | 9/2003 | Hooker | G06T 7/001 |
| | | | 382/141 |
| 2004/0080623 A1* | 4/2004 | Cleveland | G06T 5/50 |
| | | | 348/208.1 |
| 2005/0056786 A1* | 3/2005 | Shepard | G01N 25/72 |
| | | | 250/341.4 |
| 2007/0288177 A1* | 12/2007 | Rothenfusser | G01N 25/72 |
| | | | 702/40 |
| 2008/0144045 A1* | 6/2008 | Bennison | G01B 21/20 |
| | | | 356/614 |
| 2008/0237466 A1 | 10/2008 | Key | |
| 2011/0102542 A1* | 5/2011 | Chen | G06T 3/4038 |
| | | | 348/37 |
| 2011/0149015 A1* | 6/2011 | Lin | H04N 5/23238 |
| | | | 348/36 |
| 2013/0026365 A1* | 1/2013 | Jahnke | G01M 99/002 |
| | | | 250/338.1 |
| 2013/0269436 A1* | 10/2013 | Couse | G01N 29/12 |
| | | | 73/582 |

FOREIGN PATENT DOCUMENTS

| | | |
|---|---|---|
| DE | 19703484 A1 | 8/1998 |
| WO | 2005005972 A1 | 1/2005 |
| WO | 2011131263 A1 | 10/2011 |

OTHER PUBLICATIONS

International Search Report and Written Opinion for counterpart international application No. PCT/US2013/076222, dated Feb. 12, 2014, 11 pp.
International Preliminary Report on Patentability from counterpart International Application No. PCT/US2013/076222, dated Sep. 24, 2015, 7 pp.

* cited by examiner

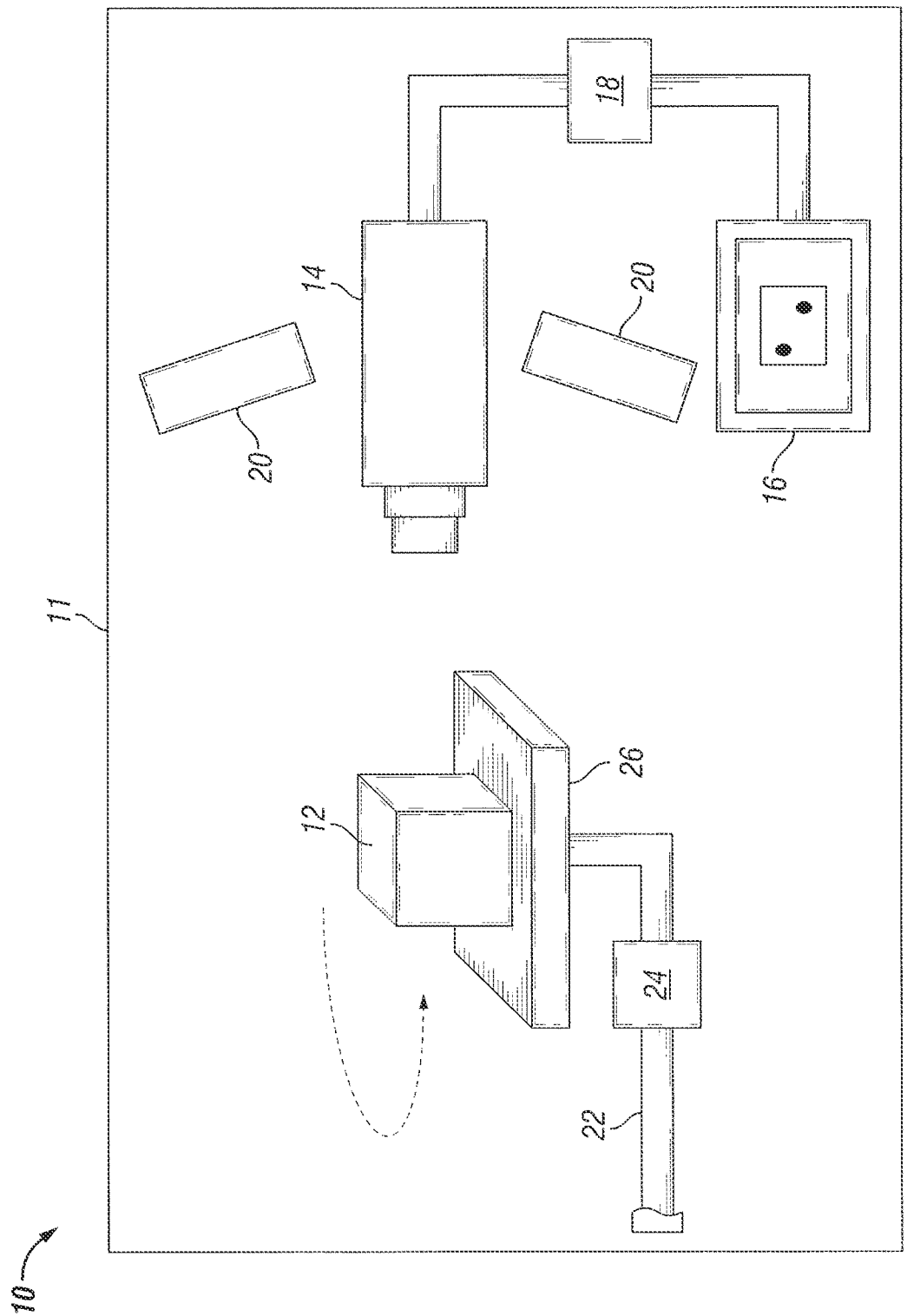

NONDESTRUCTIVE TESTING OF A COMPONENT

This application claims the benefit of U.S. Provisional Application No. 61/777,989, filed Mar. 12, 2013, which is incorporated herein by reference in its entirety.

TECHNICAL FIELD

The present disclosure relates to nondestructive testing of a component.

BACKGROUND

Methods and systems for nondestructive testing of a component, such as a gas turbine engine component, remain an area of interest. Some existing systems have various shortcomings, drawbacks, and disadvantages relative to certain applications. Accordingly, there remains a need for further contributions in this area of technology.

SUMMARY

In an example, the disclosure describes a method for nondestructive testing of a component. According to this example, the method includes flashing the component using a flash lamp configured for flash thermography, collecting first image data regarding the component using an infrared camera, flowing a fluid through the component, and collecting second image data regarding the component using the infrared camera.

In another example, the disclosure describes a method for nondestructive testing of a component. According to this example, the method includes providing a heat pulse to the exterior of the component, collecting first image data regarding the component using an infrared camera, flowing a fluid through internal passages of the component, and collecting second image data regarding the component using the infrared camera.

In a further example, the disclosure describes a system for nondestructive testing of a component. According to this example, the system includes a single inspection station for inspecting the component, means for at least one of translating or rotating the component, wherein the means for at least one of translating or rotating is disposed at the inspection station, a flash lamp configured for flash thermography disposed at the inspection station, means for supplying a fluid to the component at the inspection station for flowing thermography, and an infrared camera disposed at the inspection station and configured to capture first image data from the flash thermography and second image data from the flow thermography.

BRIEF DESCRIPTION OF THE DRAWINGS

The description herein makes reference to the accompanying drawings wherein like reference numerals refer to like parts throughout the several views, and wherein:

FIG. 1 is a conceptual and schematic diagram illustrating an example system for nondestructive testing of a component.

DETAILED DESCRIPTION

For purposes of promoting an understanding of the principles of the disclosure, reference will now be made to the examples illustrated in the drawings, and specific language will be used to describe the same. It will nonetheless be understood that no limitation of the scope of the disclosure is intended by the illustration and description of certain examples. In addition, any alterations and/or modifications of the illustrated and/or described examples are contemplated as being within the scope of the present disclosure. Further, any other applications of the principles of the disclosure, as illustrated and/or described herein, as would normally occur to one skilled in the art to which the disclosure pertains, are contemplated as being within the scope of the present disclosure.

FIG. 1 is a conceptual and schematic diagram illustrating example system 10 for nondestructive testing (NDT) of a component 12. In the example illustrated in FIG. 1, system 10 includes an inspection (test) station 11. In some examples, inspection station 11 may include an infrared (IR) camera 14, a display monitor 16, an image processor 18, one or more pulse heaters 20, a fluid supply 22, a fluid control module 24, and a movable stage 26 disposed within station 11. In some examples, one or more portions of system 10 may not be disposed within station 11. For example, fluid supply 22 and/or fluid control module 24 may not be disposed within station 11, but may be configured to supply fluid to component 12 within station 11. In some examples, inspection station 11 includes an inspection booth, e.g., a booth configured to at least partially shield at least some portions of system 10 from other light and/or heat and/or airflow/fluid sources. In other examples, inspection station 11 may take other forms.

In some examples, component 12 is a gas turbine engine turbine blade including one or more openings therein for receiving and discharging cooling air during the operation of a gas turbine engine. In other examples, component 12 may be any component of a machine, device, structure or the like for which NDT is to be performed. In some examples of a turbine blade, component 12 may be, for example, a cooled airfoil having subcomponents thereof bonded together to form structural portions and to form cooling passages. In some examples, other features may be likewise formed, in addition to or in place of those mentioned herein.

System 10 may be used to inspect component 12 may be inspected for disbonds (partially or complete bond joint failures), blocked cooling passages and/or holes, inclusions, cracks, porosity, shrinkage, and other potential metallurgical, mechanical, or other defects. Accordingly, some examples of the techniques disclosed herein include a combination of aspects of both flash thermography and flowing thermography in order to more fully assess component 12. For example, flash thermography may be suitable for detecting surface defects and near-surface defects. Flowing thermography, on the other hand, may be used to detect defects that are deeper within component 12 (e.g., from an outer surface of component 12) than is possible using flash thermography alone. In some examples, enhanced inspection (detection deeper within the part and/or detection of smaller defects) of component 12 may be attained by the use of flowing thermography in addition to using flash thermography.

The depth of detectability of a defect may be dependent upon the thermal conductivity and pathways for thermal conductivity within component 12; and may be dependent upon the relative thermal conductivity of the defect in the component or the resistance in thermal flow that is caused by the defect compared to the thermal conductivity or resistance in thermal flow of component 12. With flowing thermography, larger thermal gradients are created through the use of a cooling media directed to the back side of component 12 and/or flowed through internal passages of component 12. The relationship between the thermal conductivity of the defect, base material of the component, and the thermal path factors influence the depth and size of a defect that can be detected. Other factors may also influence the depth and size of a defect that can be detected. The depth and size of a defect that can be detected may vary widely, depending upon other factors, for example, but not limited to, the internal 3-dimensional structure of component 12 and the material from which component 12 is made.

In order to assess surface, near-surface and deeper regions, aspects of the present disclosure include utilizing an inspection station 11 that is configured to perform both flash thermography and flowing thermography. In some examples, full 2D images of component 12, that is, composite 2D images that include all 360 degrees or some other desired portion of the external surfaces of component 12, are compiled from a plurality of individual images or exposures obtained by IR camera 14 for subsequent inspection by a qualified NDT inspector/operator.

IR camera 14 is configured to obtain images from component 12 in the infrared spectrum, e.g., in the 3 to 15 microns wavelength range. In some examples, IR camera 14 may be configured to obtain image data at other frequencies in addition to or in place of in the 3 to 15 microns wavelength range. In some examples, IR camera 14 is configured for flash thermography. In other examples, IR camera 14 may be configured to perform other forms of thermography.

In some examples, display monitor 16 includes a computer display monitor. In other examples, display monitor 16 may take other forms. Display monitor 16 is communicatively coupled to IR camera 14. Display monitor 16 is configured to display image data captured by IR camera 14.

Image processor 18 is configured to execute program instructions to process the raw image data captured by IR camera 14 for display by display monitor 16. Processing performed by image processor 18 may include, for example, color conversion and/or gamut mapping to translate the infrared image data obtained by infrared camera 14 into data suitable for display at display monitor 16 and for perception by the human eye. In some examples, processing may also include, for example, one or more forms of thermographic signal reconstruction or similar signal reconstruction processing techniques, and/or may include other signal processing.

In some examples, image processor 18 is microprocessor-based and the program instructions are in the form of software stored in a memory (not shown). In some examples, image processor 18 may be a computer, such as a personal computer or a workstation computer. However, image processor 18 and program instructions for image processor 18 may include any combination of software, firmware, and hardware, including state machines, and may reflect the output of discreet devices and/or integrated circuits, which may be co-located at a particular location or distributed across more than one location, including any digital and/or analog devices configured to achieve the same or similar results as a processor-based image processor 18 executing software, firmware or hardware based instructions. In some examples, image processor 18 is communicatively coupled between IR camera 14 and display monitor 16. In other examples, image processor disposed within and considered a part of IR camera 14 or display monitor 16. In still other examples, image processor 18 may be co-located in both IR camera 14 and display monitor 16. In addition, in some examples, image processor 18 is configured to combine a plurality of images of component 12 captured by IR camera 14, and form a composite image reflecting the image data of each of the plurality of images.

Pulse heater 20 is configured to provide a pulse of heat the surface of component 12. In some examples, pulse heater 20 is a flash lamp configured for flash thermography. In other examples, pulse heater 20 may take other forms.

Fluid supply 22 is configured to supply fluid to component 12, e.g., cooling air passages of component 12. In some examples, fluid supply 22 is configured to supply fluid in the form of air to component 12. In some examples, the air is dried shop air. In other examples, fluid supply 22 may be configured to supply one or more liquids or other gases in addition to or in place of air. In some examples, fluid supply 22 is configured to supply cooled fluid to component 12. In other examples, fluid supply 22 may be configured to supply to component 12 a hot fluid and/or a room temperature fluid in addition to or in place of a cooled fluid. For example, fluid supply 22 may be all or a portion of a shop air system.

Fluid control module 24 is configured to control the flow of fluid supplied from fluid supply 22 to component 12, e.g., including the rate of flow. In some examples, fluid control module 24 is configured to provide a pulsed flow of fluid to component 12. In other examples, fluid control module may be configured to provide continuous flow in addition to or in place of pulsed flow.

Movable stage 26 is configured to support component 12, and to accommodate the delivery of fluid to component 12. In addition, movable stage 26 is configured to move component 12 relative to IR camera 14. In some examples, movable stage 26 is a 3-axis motorized stage configured to translate and/or rotate component 12 to expose different portions of component 12 to flash lamps 20 and IR camera 14. In some examples, movable stage 26 may be configured to rotate about and/or translate along any number of axes.

In order to nondestructively test component 12, component 12 is mounted into movable stage 26, and its temperature is stabilized. In other examples, component 12 may be mounted to any suitable structure, which may be fixed, or may be movable in any desired number of dimensions, in addition to or in place of movable stage 26. Once component 12 is installed, one or both of the flash thermography and flowing thermography phases are initiated. In some examples, flash thermography is completed for the entirety of or a desired portion of component 12, followed by completion of the flowing thermography phase for the entirety of or the desired portion of component 12. In some examples, for each perspective, flash and flowing thermography may be performed sequentially, whereas in other examples, all perspectives for one type of thermography may be completed prior to beginning operations with the other type of thermography.

In an example, flash thermography is employed prior to flowing thermography, although other sequences may be employed in other examples, e.g., flowing thermography first, followed by flash thermography. With flash thermography, thermal data regarding component 12 is obtained by IR camera 14, and defects are identified on display monitor 16, e.g., by a skilled NDT technician, as being represented by changes in temperature or thermal response of component 12. With flowing thermography, thermal data regarding component 12 is obtained by IR camera 14, and defects are identified on display monitor 16, e.g., by a skilled NDT technician, as being represented by changes in thermal diffusivity in component 12.

To perform flash thermography, one or more flash lamps 20 are flashed, e.g., for a few milliseconds, providing a heat pulse to the exterior of component 12. Intervening mirrors between one or more flash lamps 20 and component 12 may be employed in some examples. Heat is directed to the surface of component 12 from the flashing of flash lamp(s) 20, and flows toward the interior of component 12, which is at a lower temperature than the surface (which has been heated by flash lamp(s) 20). After component 12 is flashed by flash lamp(s) 20, infrared camera is 14 employed to collect first infrared (IR) image data from component 12 from a first perspective, e.g., in a manner consistent with conventional flash thermography. As used herein, "first" image data pertains to flash thermography image data. The data obtained from IR camera 14 is processed via image processor 18 for display at display 16.

In some examples, component 12 is then rotated and/or translated using movable stage 26 to expose a different portion of its surface to IR camera 14 to obtain a different perspective of component 12. In other examples, IR camera 14 and/or intervening mirrors (mirrors optically disposed between IR camera 14 and component 12) may be moved in addition to or in place of moving component 12 with movable stage 26 in order to provide relative rotation and/or translation as between IR camera 14 and component 12 to capture different portions or surfaces of component 12 with IR camera 14. Component 12 is flashed with flash lamps 20, and image data is collected by IR camera 14. The process may be repeated, in which component 12 is rotated about the desired number of axes, and/or translated, flashed with the flash lamps 20, and image data collected by IR camera 14 for a plurality of perspectives, e.g., in sequential fashion, until image data for the entirety of component 12 or a desired portion of component 12 has been captured by IR camera 14. Each perspective may be based on a different degree of relative rotation and/or translation as between component 12 and IR camera 14. A composite 2D image of all or a desired portion of component 12 may then be compiled, e.g., using image processor 18, based on the image data obtained from IR camera 14, for display at display 16 for interpretation, e.g., by an NDT inspector/technician. For example, the composite image may be a 2D image spanning 360 degrees of component 12 in a desired plane. By providing a composite image, NDT technician fatigue may be reduced, and the speed of inspection may be increased.

During flowing thermography, fluid, e.g., air, may be flowed through internal passages of component 12 from fluid supply 22, and is regulated or controlled by fluid control module 24. In some examples, the fluid supplied to component 12 is pulsed at least one time at a selected frequency. The selected frequency may be determined using one or more techniques, including, but not limited to, optimization or computer modeling, e.g., to provide the optimum thermal gradient vs. time or depth being inspected. This will vary depending upon various factors, including the material, type of defect, defect location, and the internal structure or conductive path within component 12.

Infrared camera 14 is employed to collect second infrared (IR) image data from component 12 from a first perspective. As used herein, "second" image data pertains to flowing thermography image data. In some examples, flash lamps 20 are not used in the flowing thermography phase. The data obtained from IR camera 14 may be processed via image processor 18. Next, in some examples, component 12 is rotated and/or translated using movable stage 26 to expose a different portion of its surface to IR camera 14 to obtain a different perspective of component 12. In other examples, IR camera 14 and/or intervening mirrors (mirrors optically disposed between IR camera 14 and component 12) may be moved in addition to or in place of moving component 12 with movable stage 26 in order to provide relative rotation and/or translation as between IR camera 14 and component 12 to capture image data for different portions or surfaces of component 12 with IR camera 14.

After relative rotation and/or translation of IR camera 14 and component 12, fluid, e.g., air is flowed through component 12, and image data is collected by IR camera 14. The process may be repeated, in which component 12 is rotated about the desired number of axes, and/or translated, fluid, e.g., air, is flowed through component 12, and image data collected by IR camera 14 for a plurality of perspectives, e.g., in sequential fashion, until image data for the entirety of component 12 or a desired portion of component 12 has been captured by IR camera 14. Each perspective may be based on a different degree of relative rotation and/or translation as between component 12 and IR camera 14. A second composite 2D image of all or a desired portion of component 12 then may be compiled, e.g., using image processor 18, based on the image data obtained from IR camera 14. In some examples, the plurality of perspectives used for the flash and flowing thermography are the same. In other examples, different perspectives may be employed for flash thermography and flowing thermography. By providing both flash thermography and flowing thermography in a single setup, the rate of inspection of component 12 may be increased.

In some examples, the disclosure describes a method for nondestructive testing of a component, comprising: flashing the component using a flash lamp configured for flash thermography; collecting first image data regarding the component using an infrared camera; flowing a fluid through the component; and collecting second image data regarding the component using the infrared camera.

In some examples, the method further includes rotating the component to a rotated position; flashing the component using the flash lamp configured for flash thermography; and collecting first image data regarding the component at the rotated position.

In some examples, the method further includes rotating the component to a rotated position; flowing the fluid through the component; and collecting second image data regarding the component at the rotated position.

In some examples, flowing the fluid through the component includes pulsing the fluid through the component.

In some examples, the fluid includes a cooled fluid.

In some examples, the method further includes rotating the component a first plurality of times to a first plurality of rotated positions; at each respective rotated position of the first plurality of rotated positions, flashing the component using the flash lamp configured for flash thermography; at each respective rotated position of the first plurality of rotated positions, collecting first image data regarding the component at the respective rotated position using the infrared camera; rotating the component a second plurality of times to a second plurality of rotated positions; at each respective rotated position of the second plurality of rotated positions, flowing the fluid through the component; and at each respective rotated position of the second plurality of rotated positions, collecting second image data regarding the component at the respective rotated position using the infrared camera.

In some examples, at least one of rotating the component the first plurality of times to a first plurality of rotated positions or rotating the component a second plurality of times to the second plurality of rotated positions includes using a three-axis stage to rotate the component.

In some examples, the method further includes providing relative rotation between the infrared camera and the component; collecting first image data from each perspective of a plurality of perspectives of the component, wherein each perspective is at a different degree of at least one of relative rotation or translation between the infrared camera and the component; and generating a composite image of the component based on the first image data collected at each perspective of the plurality of perspectives.

In some examples, the plurality of perspectives comprises a first plurality of perspectives, and the method further includes
collecting second image data from each perspective of a second plurality of perspectives of the component, wherein each perspective of the second plurality of perspectives is at a different degree of at least one of relative rotation or translation between the infrared camera and the component; and generating the composite image of the component based on the first image data collected at the first plurality of perspectives and based on the second image data collected at the second plurality of perspectives.

In some examples, the first plurality of perspectives and the second plurality of perspectives include the same perspectives.

In some examples, the composite image includes a two dimensional image spanning 360° of the component in a desired plane.

In some examples, the flash lamp is not flashed while collecting second image data regarding the component.

In some examples the present disclosure describes a method for nondestructive testing of a component, comprising: providing a heat pulse to the exterior of the component; collecting first image data regarding the component using an infrared camera; flowing a fluid through internal passages of the component; and collecting second image data regarding the component using the infrared camera.

In some examples, providing the heat pulse includes flashing a flash lamp configured for flash thermography.

In some examples, the method further includes rotating the component to a rotated position, providing the heat pulse to the exterior of the component, and collecting first image data regarding the component at the rotated position using the infrared camera.

In some examples, the method further includes rotating the component to a rotated position, flowing the fluid through internal passages of the component, and collecting second image data regarding the component at the rotated position using the infrared camera.

In some examples, flowing fluid through internal passages of the component comprises pulsing the fluid through internal passages of the component.

In some examples, the method further includes providing relative rotation between the infrared camera and the component; collecting first image data from each perspective of a plurality of perspectives of the component, wherein each perspective is at a different degree of at least one of relative rotation or translation between the infrared camera and the component; and generating a composite image of the component based on the first image data collected at each perspective of the plurality of perspectives.

In some examples, the plurality of perspectives comprises a first plurality of perspectives, and the method further includes collecting second image data from each perspective of a second plurality of perspectives of the component, wherein each perspective of the second plurality of perspectives is at a different degree of at least one of relative rotation or translation between the infrared camera and the component; and generating the composite image of the component based on the first image data collected at the first plurality of perspectives and based on the second image data collected at the second plurality of perspectives.

In some examples, the present disclosure describes a system for nondestructive testing of a component, comprising: a single inspection station for inspecting the component; means for at least one of translating or rotating the component, wherein the means for at least one of translating or rotating is disposed at the inspection station; a flash lamp configured for flash thermography disposed at the inspection station; means for supplying a fluid to the component at the inspection station for flowing thermography; and an infrared camera disposed at the inspection station and configured to capture first image data from the flash thermography and second image data from the flow thermography.

While the disclosure has been described in connection with some examples, it is to be understood that the disclosure is not to be limited to the disclosed examples, but is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any example lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A method for nondestructive testing of a component, comprising:
    flashing the component using a flash lamp configured for flash thermography;
    collecting first image data regarding a response of the component only to the flashing of the flash lamp using an infrared camera from each perspective of a first plurality of perspectives of the component, wherein each perspective is at a different degree of at least one of relative rotation or translation between the infrared camera and the component;
    generating a first composite image of the component based on the first image data;
    flowing a fluid through the component for flow thermography;
    collecting second image data regarding a response of the component only to the flowing of the fluid through the component using the infrared camera from each perspective of a second plurality of perspectives of the component, wherein each perspective of the second plurality of perspectives is at a different degree of at least one of relative rotation or translation between the infrared camera and the component; and
    generating a second composite image of the component based on the second image data.

2. The method of claim 1, wherein collecting the first image data comprises:

rotating the component to a rotated position, wherein at least one perspective of the plurality of perspectives comprises the rotated position;
flashing the component using the flash lamp configured for flash thermography; and
collecting first image data regarding the response of the component only to the flashing of the flash lamp at the rotated position.

3. The method of claim 1, wherein collecting the second image data comprises:
rotating the component to a rotated position, wherein at least one perspective of the plurality of perspectives comprises the rotated position;
flowing the fluid through the component; and
collecting second image data regarding the response of the component only to the flowing of the fluid at the rotated position.

4. The method of claim 1, wherein flowing the fluid through the component comprises pulsing the fluid through the component.

5. The method of claim 1, wherein the fluid comprises a cooled fluid.

6. The method of claim 1, wherein collecting the first image data comprises:
rotating the component a first plurality of times to a first plurality of rotated positions, wherein the plurality of perspectives comprises each rotated position of the first plurality of rotated positions;
at each respective rotated position of the first plurality of rotated positions, flashing the component using the flash lamp configured for flash thermography;
at each respective rotated position of the first plurality of rotated positions, collecting first image data regarding the response of the component only to the flashing of the flash lamp at the respective rotated position using the infrared camera; and wherein collecting the second image data comprises:
rotating the component a second plurality of times to a second plurality of rotated positions, wherein the plurality of perspectives comprises each rotated position of the second plurality of rotated positions;
at each respective rotated position of the second plurality of rotated positions, flowing the fluid through the component; and
at each respective rotated position of the second plurality of rotated positions, collecting second image data regarding the response of the component only to the flowing of the fluid at the respective rotated position using the infrared camera.

7. The method of claim 6, wherein at least one of rotating the component the first plurality of times to a first plurality of rotated positions or rotating the component a second plurality of times to the second plurality of rotated positions comprises using a three-axis stage to rotate the component.

8. The method of claim 1, further comprising
generating a third composite image of the component based on the first image data collected at the first plurality of perspectives and based on the second image data collected at the second plurality of perspectives.

9. The method of claim 8, wherein the first plurality of perspectives and the second plurality of perspectives include the same perspectives.

10. The method of claim 8, wherein the composite image comprises a two dimensional image spanning 360° of the component in a desired plane.

11. The method of claim 1, wherein the flash lamp is not flashed while collecting second image data regarding the component.

12. A method for nondestructive testing of a component, comprising:
subjecting the exterior of the component to a heat pulse;
collecting first image data regarding a response of the component only to the heat pulse using an infrared camera;
flowing a fluid through internal passages of the component;
collecting second image data regarding a response of the component only to the flowing of the fluid through the internal passages using the infrared camera; and
generating a composite image of the component from the first image data and the second image data.

13. The method of claim 12, wherein subjecting the exterior of the component to the heat pulse comprises flashing a flash lamp configured for flash thermography.

14. The method of claim 12, further comprising:
rotating the component to a rotated position;
subjecting the exterior of the component to a heat pulse; and
collecting first image data regarding the response of the component only to the heat pulse at the rotated position using the infrared camera.

15. The method of claim 12, further comprising:
rotating the component to a rotated position;
flowing the fluid through internal passages of the component; and
collecting second image data regarding the response of the component only to the flowing of the fluid at the rotated position using the infrared camera.

16. The method of claim 12, wherein flowing the fluid through internal passages of the component comprises pulsing the fluid through internal passages of the component.

17. The method of claim 12, further comprising:
collecting first image data from each perspective of a plurality of perspectives of the component, wherein each perspective is at a different degree of at least one of relative rotation or translation between the infrared camera and the component;
wherein generating the composite image comprises generating a first composite image of the component based on the first image data collected at each perspective of the plurality of perspectives.

18. The method of claim 17, wherein the plurality of perspectives comprises a first plurality of perspectives, further comprising:
collecting second image data from each perspective of a second plurality of perspectives of the component, wherein each perspective of the second plurality of perspectives is at a different degree of at least one of relative rotation or translation between the infrared camera and the component;
wherein generating the composite image comprises generating a second composite image of the component based on the second image data collected at the second plurality of perspectives.

19. A system for nondestructive testing of a component, comprising:
a single inspection station for inspecting the component;
means for at least one of translating or rotating the component, wherein the means for at least one of translating or rotating is disposed at the inspection station;

a flash lamp configured for flash thermography disposed at the inspection station;

means for supplying a fluid to the component at the inspection station for flowing thermography;

an infrared camera disposed at the inspection station and configured to capture first image data from only the flash thermography from each perspective of a first plurality of perspectives of the component, wherein each perspective is at a different degree of at least one of relative rotation or translation between the infrared camera and the component, and second image data from only the flow thermography from each perspective of a second plurality of perspectives of the component, wherein each perspective of the second plurality of perspectives is at a different degree of at least one of relative rotation or translation between the infrared camera and the component; and a computing device configured to generate a first composite image from the first image data and a second composite image from the second image data.

* * * * *